(12) United States Patent
Confalonieri et al.

(10) Patent No.: US 8,230,196 B1
(45) Date of Patent: Jul. 24, 2012

(54) CONFIGURABLE PARTITIONS FOR NON-VOLATILE MEMORY

(75) Inventors: Emanuele Confalonieri, Milan (IT); Corrado Villa, Milan (IT)

(73) Assignee: Micron Technology, Inc., Boise, ID (US)

( * ) Notice: Subject to any disclaimer, the term of this patent is extended or adjusted under 35 U.S.C. 154(b) by 384 days.

(21) Appl. No.: 12/473,629

(22) Filed: May 28, 2009

(51) Int. Cl.
*G06F 12/00* (2006.01)
(52) U.S. Cl. ............ 711/173; 711/5; 711/E12.046
(58) Field of Classification Search ............ 711/173, 711/E12.008, 101, 203
See application file for complete search history.

(56) References Cited

U.S. PATENT DOCUMENTS

| | | | | |
|---|---|---|---|---|
| 6,047,339 A | * | 4/2000 | Su et al. | 710/56 |
| 2006/0004942 A1 | * | 1/2006 | Hetherington et al. | 711/3 |
| 2009/0196102 A1 | * | 8/2009 | Kim | 365/185.11 |

OTHER PUBLICATIONS

Numonyx, Flash File Systems Overview white paper, Oct. 2008, 12 pages.

* cited by examiner

*Primary Examiner* — Kevin Verbrugge
*Assistant Examiner* — Victor Wang
(74) *Attorney, Agent, or Firm* — Berkeley Law & Technology Group, LLP

(57) ABSTRACT

Example embodiments for configuring a non-volatile memory device may comprise configuring M physical partitions of the non-volatile memory into two or more banks, wherein the two or more banks respectively comprise one or more of the M physical partitions, and wherein at least a first of the M physical partitions comprises a first size and wherein at least a second of the M physical partitions comprises a second size.

20 Claims, 5 Drawing Sheets

CONFIGURABLE PARTITIONS FOR NON-VOLATILE MEMORY

BACKGROUND

Subject matter disclosed herein may relate to non-volatile memory devices, and may relate more particularly to partitioning non-volatile memory devices.

Non-volatile memory devices, including flash memory devices, may be found in a wide range of electronic devices. In particular, flash memory devices may be used in computers, digital cameras, cellular telephones, personal digital assistants, etc. For many applications, flash memory devices may store instructions to be executed on a processor, and in at least some of these applications, the processor may fetch instructions from the flash memory devices, such as, for example, in execute-in-place (XiP) implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
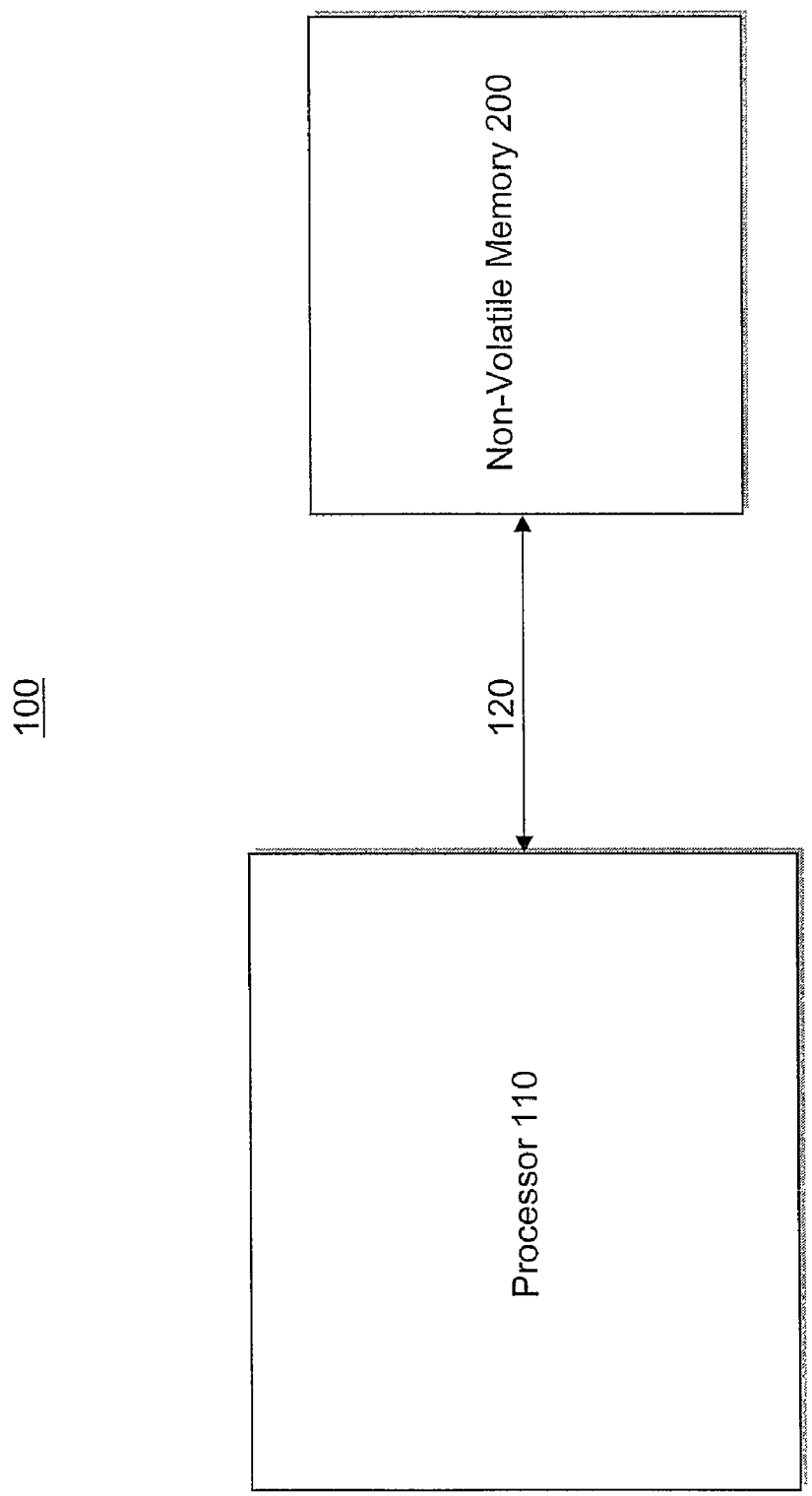
FIG. 1 is a schematic block diagram illustrating an example embodiment of a computing platform.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized. Furthermore, structural or logical changes may be made without departing from the scope of claimed subject matter. It should also be noted that directions or references, for example, up, down, top, bottom, and so on, may be used to facilitate discussion of the drawings and are not intended to restrict the application of claimed subject matter. Therefore, the following detailed description is not to be taken to limit the scope of claimed subject matter or their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

As discussed above, for many applications, non-volatile memory devices such as flash memory devices may store instructions to be executed on a processor, and in at least some of these applications, the processor may fetch instructions from the non-volatile memory devices, such as, for example, in execute-in-place (XiP) implementations. As used herein, the term "execute-in-place", along with its abbreviation "XiP", relates to a processor fetching instructions from a long term storage device, such as, for example, a flash memory, rather than fetching instructions from an intermediate storage, such as, for example, a dynamic random access memory (DRAM).

In order to enhance throughput, some non-volatile memory devices may support what may be referred to as Read While Write (RWW) functionality. Devices supporting RWW may comprise multiple partitions with individual capabilities to read signals representative of data and/or information from one or more storage locations in a respective partition and to write signals representative of data and/or information to one or more storage locations in a respective partition. In such devices, it may be possible to write signals representative of data and/or information to one partition of the non-volatile memory device and to concurrently read signals representative of data and/or information from another partition of the non-volatile memory device. According to an embodiment, one or more portions of non-volatile memory device 200 may store signals representative of data and/or information as expressed by a particular state of non-volatile memory device 200. For example, an electronic signal representative of data and/or information may be "stored" in a portion of memory device by affecting or changing the state of such portions of memory device 200 to represent data and/or information as binary information (e.g., ones and zeros, individually referred to herein as "1" and "0"). As such, in a particular implementation, such a change of state of the portion of memory to store a signal representative of data and/or information constitutes a transformation of non-volatile memory device 200 to a different state or thing.

A non-volatile memory address space may be partitioned into two main portions, for some example implementations. For example, a flash memory device may have a data area for storing signals representative of data and may also have a code area for storing signals representative of software instructions that may be fetched and executed by a processor. Of course, data and code storage areas are merely examples of possible uses for storage areas of non-volatile memory devices, and the scope of claimed subject matter is not limited in this respect. Additionally, although embodiments described herein utilize two separate main portions of non-volatile memory devices, the scope of claimed subject matter is not limited in this respect, and other embodiments are possible using other schemes for organizing non-volatile memory devices.

In order to provide flexibility in apportioning a non-volatile memory device into data and code areas, also referred to as data and code banks, the non-volatile memory device may be designed and manufactured with a number of partitions. The greater the number of partitions for a given amount of storage capacity, the greater the degree of flexibility afforded to the system designer in tailoring the non-volatile memory device to the system designer's desires. Through software control, some example embodiments of flash memory devices may allocate a subset of the total number of partitions of the non-volatile memory device to serve as a code area. The remaining partitions may be allocated as a data area, for example. The amount of partitions allocated to the individual code and data areas may vary from implementation to implementation, and/or from application to application depending at least in part on the varying size of the code to be stored in the code area.

As previously mentioned, a larger number of partitions in a non-volatile memory device for a given amount of storage capacity may yield smaller partitions that may provide a system designer with an amount of flexibility that is advantageous. With such smaller and more numerous partitions, the system designer may allocate with greater precision an amount of memory desired for a particular portion. However, with an increase in the amount of partitions, an overall die size for the non-volatile memory device may also increase, potentially resulting in increased manufacturing costs, to name but one example potential disadvantage of increasing the amount of partitions.

To enable potential enhancements to non-volatile memory devices in the areas of configuration and programming flexibility as well as efficient utilization of die space, in one or more embodiments, a non-volatile memory device may comprise a plurality of partitions. The partitions may be allocated between a code bank and a data bank, for example. Rather than providing an increased amount of smaller partitions to provide flexibility to system designers, in one or more embodiments at least some of the plurality of partitions may have varying sizes. In an embodiment, an increase in flexibility may be provided while the overall number of partitions may be relatively small. For example, in one or more embodiments a non-volatile memory device comprising M physical partitions may be configured into two or more banks. For this example, the two or more banks may respectively comprise one or more of the M physical partitions. At least a first partition of the M physical partitions may comprise a first size and at least a second partition of the M physical partitions may comprise a second size. Remapping logic may remap N logical partitions to the M physical partitions. For the present example, N may be greater than M. As used herein, the term "size" as it relates to a memory device, partition, or other portion of a memory device is synonymous with the term "storage capacity", and the terms may be used interchangeably.

One potential advantage of remapping a larger number of logical partitions to a smaller number of physical partitions may be maintaining compatibility with existing software developed to enable a processor to access non-volatile memory manufactured with relatively larger amounts of uniformly-sized partitions. For example, in one or more embodiments, software developed to enable a processor to access memory devices having sixteen partitions may be utilized to access a five-partition non-volatile memory device in a manner that is transparent to the processor and to the remainder of the system. Examples of partitioning non-volatile memory devices to enable greater or equivalent flexibility using reduced amounts of non-uniformly-sized partitions are presented in greater detail, below.

FIG. 1 is a block diagram of an example embodiment of a computing platform 100, comprising a processor 110 and a non-volatile memory 200. For the present example, non-volatile memory device 200 comprises a flash memory device, although the scope of claimed subject matter is not limited in this respect. Memory 200 for this example is coupled to processor 110 by way of a parallel interconnect 120, as discussed more fully below, although again, the scope of claimed subject matter is not limited in this respect. Further, in an embodiment, memory 200 may comprise a plurality of partitions, at least some of which may have varying sizes. Individual partitions from the plurality of partitions for the present example embodiment may be allocated to either a data memory bank or a code memory bank. The allocation may be specified by writing signals representing an appropriate value to a configuration register, described below. Also for an embodiment, processor 110 may fetch instructions stored in the code bank and may execute the fetched instructions. Data may also be written to and/or read from the data bank by processor 110. For the present example, the configuration of computing platform 100 may comprise an execute-in-place (XiP) implementation, wherein processor 110 fetches instructions directly from long-term memory, comprising non-volatile memory device 200.

The term "computing platform" as used herein refers to a system or a device that includes the ability to process or store data in the form of signals. Thus, a computing platform, in this context, may comprise hardware, software, firmware or any combination thereof. Computing platform 100, as depicted in FIG. 1, is merely one such example, and the scope of claimed subject matter is not limited in these respects. For one or more embodiments, a computing platform may comprise any of a wide range of digital electronic devices, including, but not limited to, personal desktop or notebook computers, high-definition televisions, digital versatile disc (DVD) players or recorders, game consoles, satellite television receivers, cellular telephones, personal digital assistants, mobile audio or video playback or recording devices, and so on. Further, unless specifically stated otherwise, a process as described herein, with reference to flow diagrams or otherwise, may also be executed or controlled, in whole or in part, by a computing platform. For the example embodiments described herein, computing platform 100 may comprise a cellular telephone, although again, the scope of claimed subject matter is not so limited.

As mentioned above, for an embodiment, processor 110 may be coupled to non-volatile memory 200 by way of a parallel interconnect 120. In another example embodiment, interconnect 120 may comprise a serial peripheral interface (SPI). The term "serial peripheral interface" for an embodiment refers to a de facto standard for serial communications between components in some electronic devices. The scope of claimed subject matter is not limited to any particular type of interconnect between a processor and a memory device. Also, although processor 110 is depicted as being directly connected to non-volatile memory 200, other embodiments within the scope of claimed subject matter may indirectly couple processor 110 to memory 200.

As previously mentioned, non-volatile memory device 200 may comprise a flash memory device, for one example embodiment. Flash memory may be characterized at least in part by an ability to be electrically erasable and programmable, and may be utilized in a very wide range of electronic device types, including, but not limited to, digital cameras, cellular telephones, personal digital assistants, portable navigation devices, portable music players, notebook computers, desktop computers, etc., to name but a few examples. Also, flash memory devices may comprise either parallel data interfaces or serial interfaces. Parallel interfaces, in at least some instances, may allow for relatively good data throughput due at least in part to increased numbers of input/output terminals. Serial interfaces, on the other hand, may provide reduced costs due at least in part to reduced numbers of input/output terminals.

Although example embodiments described herein discuss non-volatile memory as comprising flash memory devices, the scope of claimed subject matter is not limited in this respect and other embodiments may utilize other types of non-volatile memory devices. For example, one or more embodiments may include read-only memory (ROM), phase change memory (PCM), etc. Also, the scope of claimed subject matter is not limited to a particular type of flash memory. Embodiments in accordance with claimed subject matter may comprise NOR flash memory, to name but one example.

Figure 2:
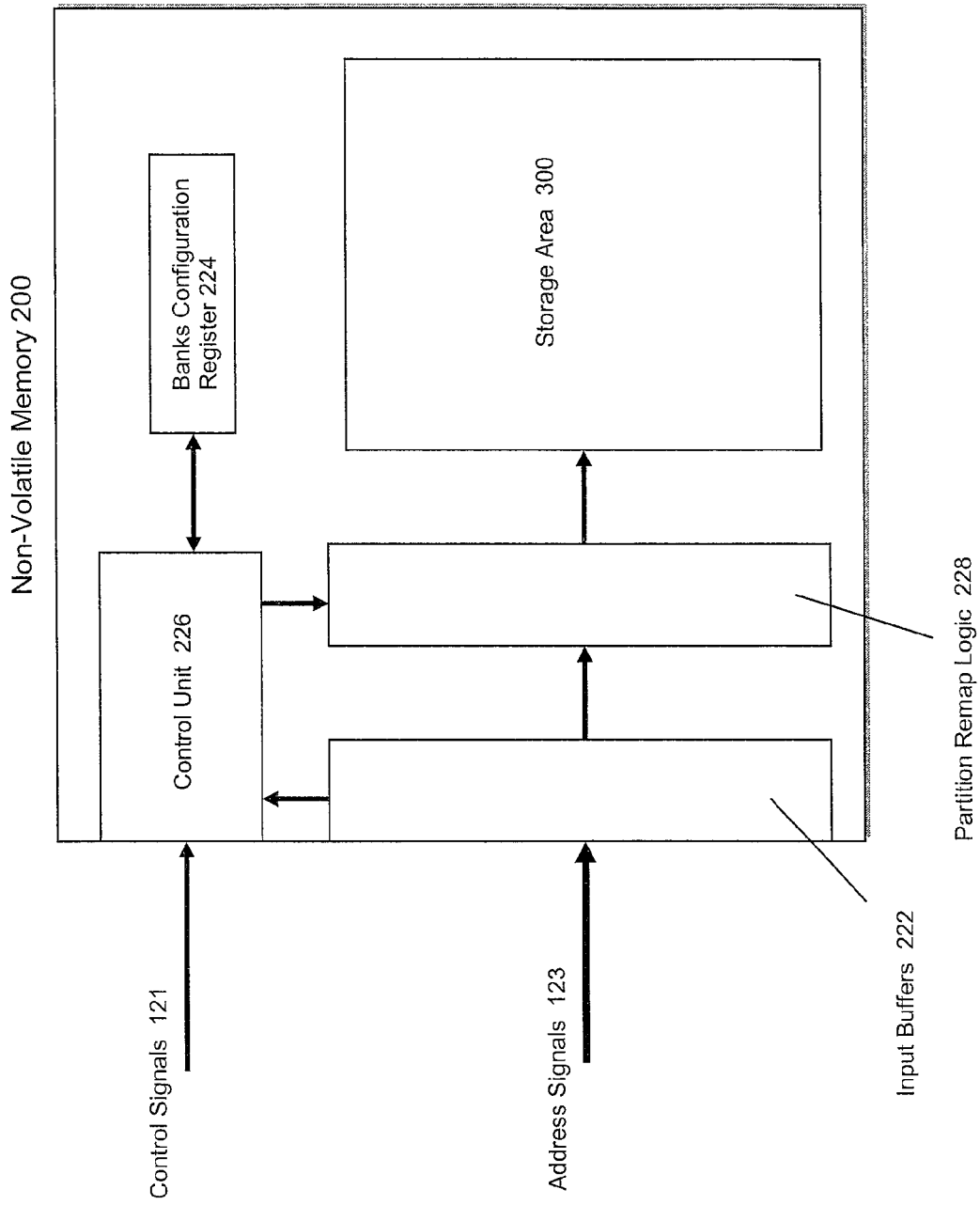
FIG. 2 is a schematic block diagram depicting an example embodiment of a non-volatile memory device.
Figure 3:
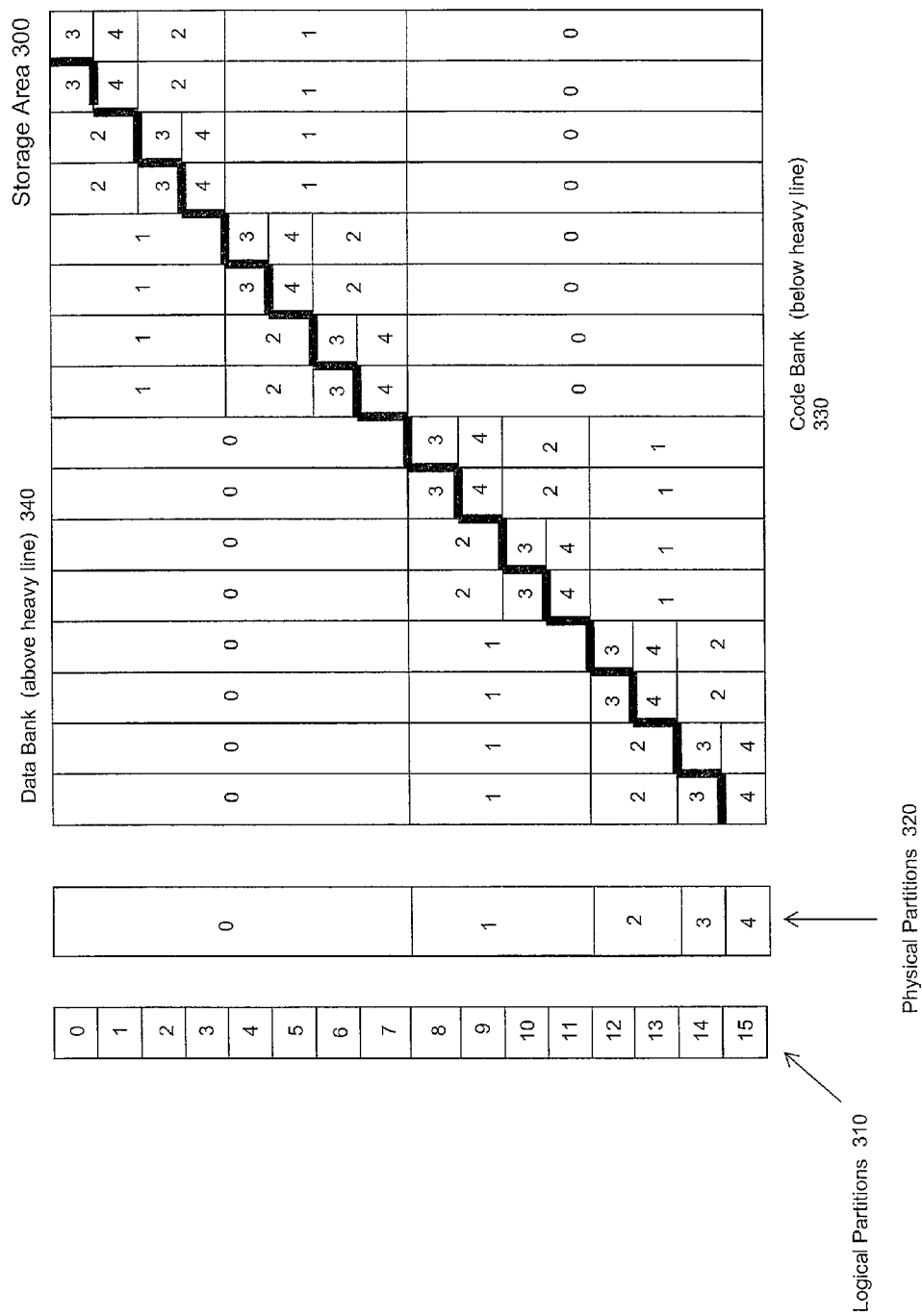
FIG. 3 is a schematic block diagram depicting an example embodiment of a non-volatile memory storage area configured into multiple partitions.
Figure 4:
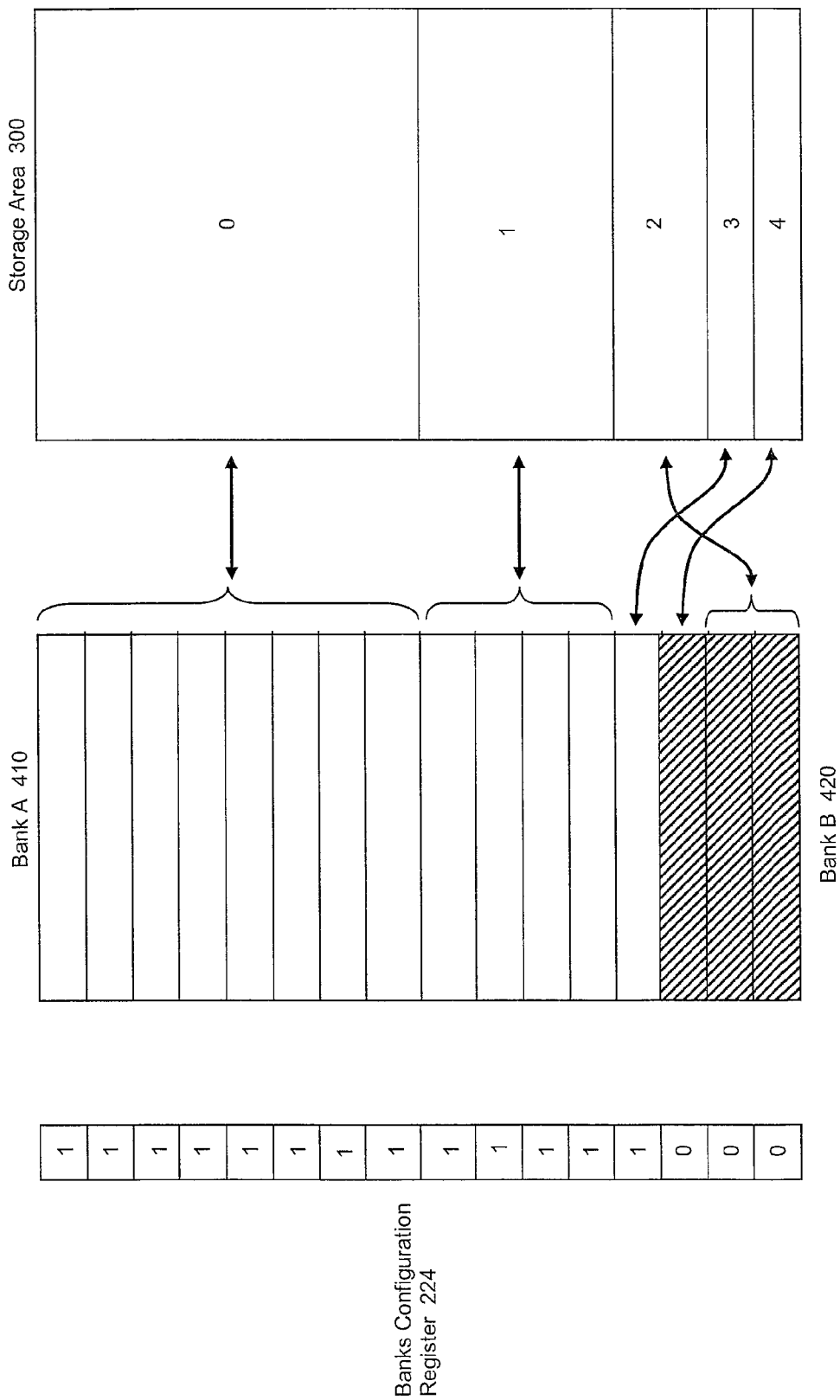
FIG. 4 is a schematic block diagram depicting an address translation from example logical partitions to an example configuration of a plurality of example physical partitions.

FIG. 2 is a schematic block diagram depicting an example embodiment of non-volatile memory device 200 including a storage area 300 that may be allocated between a data bank and a code bank (not shown in FIG. 2, but see FIGS. 3 and 4). For this example, memory device 200 may comprise a NOR flash memory device, although again, the scope of claimed subject matter is not limited in this respect. For one or more embodiments, non-volatile memory 200 may comprise a control unit 226 and a memory banks configuration register 224. For one or more embodiments, memory banks configuration register 224 may comprise a non-volatile register. Also for one or more embodiments, non-volatile memory banks configuration register 224 may comprise one or more flash memory cells, although the scope of claimed subject matter is not limited in this respect. Further, non-volatile memory 200 may store instructions that may comprise code for any of a wide range of possible operating systems and/or applications. The instructions may be executed by processor 110. As previously mentioned, processor 110 and memory 200 may be configured as an XiP type implementation, wherein processor 110 may fetch instructions directly from a long-term storage device such as non-volatile memory 200.

For one or more embodiments, control unit 226 may receive one or more control signals from processor 110 and may generate one or more internal control signals to perform any of a number of operations, including data read and/or write operations, by which processor 110 may access the data and/or code banks within storage area 300, for example. Also, control unit 226 may further generate one or more internal control signals to perform memory banks configuration register data write operations. As used herein, the term "control unit" is meant to include any circuitry or logic involved in the management and/or execution of command sequences as they relate to non-volatile memory devices.

Non-volatile memory 200 for this example embodiment may further comprise a plurality of input buffers 222 to receive one or more address signals 123 from processor 110 and a partition remap logic unit 228 coupled to storage area 300. As is explained in more detail below, processor 110 for this example may transmit one or more signals representing a memory access command to non-volatile memory 200. The memory access command may include an address delivered on address lines 123 received at input buffers 222. For the present embodiment, processor 110 may execute a software agent of some kind that requests access to storage area 300. In particular, the software agent itself may be executed from instructions stored in the code bank of storage area 300. Here, processor 110 may fetch instructions for the software agent and may further execute the fetched instructions. One or more of the instructions from the software agent may comprise a request for a read or write access to the data bank of storage area 300.

For the present example, it may be assumed for purposes of explanation and example that the software agent was created for execution in a computing platform with a non-volatile memory device having a given storage capacity and having sixteen uniformly-sized partitions, with one or more particular partitions allocated for the code bank with the remainder allocated to the data bank. Accordingly, for the present example, the software agent, if executed by processor 110, may generate addresses for read or write accesses to storage area 300 in accordance with the assumptions presented above of the given storage capacity and of the sixteen uniformly-sized partitions. The sixteen partitions may be referred to as logical partitions, and the partitions of storage area 300 may be referred to as physical partitions. For the present example, storage area 300 may comprise five physical partitions, although the scope of claimed subject matter is not limited in this respect.

At least in part in response to receiving a read or write access command from processor 110 to storage area 300, partition remap logic unit 228 may remap the address received at input buffers 222 such that an address identifying a storage location in one of the sixteen logical partitions is remapped to an address identifying a storage location in an appropriate one of the five physical partitions of storage area 300. For one or more embodiments, any of a variety of remapping schemes may be utilized in accordance with claimed subject matter. For one embodiment, if "N" represents the number of logical partitions, the number of physical partitions "M" of storage area 300 may be given by $M=1+\log_2(N)$. Thus, for an embodiment, to achieve the flexibility of sixteen uniformly-sized partitions, storage area 300 may comprise five physical partitions. Also for an embodiment, the sizes of the various physical partitions may be determined according to a geometric rule. For example, a first partition may comprise one half of the storage capacity of storage area 300, a second partition may comprise one quarter of the storage capacity of storage area 300, a third partition may comprise one eighth of the storage capacity of storage area 300, and fourth and fifth physical partitions individually comprise one sixteenth of the storage capacity of storage area 300. With these physical partitions, the address space for storage area 300 may be partitioned into the code and data banks with the identical granularity as would be the case if storage area 300 had been implemented as sixteen uniformly-sized partitions. Further, due to the reduced number of physical partitions, the die size for non-volatile memory 200 may be reduced. Thus, the present example embodiment, as well as others described herein, succeed in providing flexibility in the allocation of storage area 300 while reducing die size as compared to a case where the larger number of uniformly-sized partitions are used.

FIG. 3 is a schematic block diagram depicting an example embodiment of non-volatile memory storage area 300 configured into multiple partitions. A range of examples are provided in FIG. 3. For storage area 300 for this example embodiment, physical partitions 320 may comprise five partitions, as depicted. For the present example, physical partition 0 comprises one half of the total storage capacity of storage area 300. Physical partition 1 comprises one quarter of the total storage capacity of storage area 300, and physical partition 2 comprises one eighth of the total storage capacity of storage area 300. Also for this example, physical partitions 3 and 4 individually comprise one sixteenth of the total storage capacity of storage area 300. The various physical partitions may be allocated in a variety of ways, as depicted by the examples shown in connection with storage area 300 in FIG. 3. For example, in the left-most column shown for storage area 300, physical partitions 0-3 are depicted as being allocated to a data bank 340, and physical partition 4 is depicted as being allocated to a code bank 330. As may be observed through studying the various examples provided in FIG. 3, by allocating the non-uniformly-sized physical partitions 320 in different ways, the size of code bank 330 may be adjusted with a granularity of one sixteenth of the total storage capacity of storage area 300, which is the identical granularity that would be provided in an implementation utilizing sixteen uniformly-sized partitions, such as the sixteen logical partitions 310 depicted in FIG. 3. It may be noted in FIG. 3 that for storage area 300, the area above the heavy line for the various example allocations represents partitions allocated to data bank 340, while the area below the heavy line represents partitions allocated to code bank 330.

FIG. 4 is a schematic block diagram depicting an address translation from example logical partitions to an example configuration of a plurality of example physical partitions. For the present example, sixteen logical partitions are depicted as being allocated to either Bank A 410 or to Bank B 420. In one or more embodiments, a value may be written to and stored in banks configuration register 224 that indicates to which Bank the various logical partitions should be allocated. For the present example, a bit value of "1" written to banks configuration register 224 results in an associated logical partition being allocated to Bank A 410, and a bit value of "0" written to banks configuration register 224 results in an associated logical partition being allocated to Bank B 420. For the example depicted in FIG. 4, the first thirteen logical partitions are allocated to Bank A 410 at least in part in response to bit values of "1" being written to the associated locations of banks configuration register 224. The last three logical partitions are allocated to Bank B 420 at least in part in response to bit values of "0" being written to the associated locations of banks configuration register 224. Of course, the above configuration register scheme is merely one example of how a boundary between two banks of memory may be defined, and the scope of claimed subject matter is not limited in this respect.

Continuing with the example of FIG. 4, it may be noted that the sixteen combined logical partitions of Bank A 410 and Bank B 420 may be remapped to the five physical partitions of storage area 300 as illustrated by the arrows between banks 410 and 420 and storage area 300. For this example, the last two logical partitions of bank B 420 may be remapped to physical partition 2, which for this example comprises one eighth of the total storage capacity of storage area 300. Of course, this works because two sixteenths is the same as one eighth, and the two logical partitions fit into physical partition 2. The remaining logical partition of bank B 420 may be mapped to one of the one sixteenth sized physical partitions. For this example, the remaining logical partition of bank B 420 may be remapped to physical partition 4. Thus, if a memory access request is received from processor 110 at non-volatile memory 200 and the address associated with the memory access request identifies a storage location anywhere in the first eight logical partitions of bank A 410, the address may be remapped to an appropriate storage location in physical partition 0. Similarly, if the memory access request address identifies a storage location in the fifteenth logical partition (second from the bottom of bank B 420), the address may be remapped to an appropriate storage location in physical partition 2. Of course, the remapping and partitioning operations depicted in FIG. 4 and described above are merely examples, and the scope of claimed subject matter is not limited in these respects.

As previously mentioned, a variety of remapping and/or repartitioning schemes may be implemented in accordance with claimed subject matter. For the previous example depicted in FIGS. 3 and 4, sixteen logical partitions are mapped into five physical partitions. Also, as previously noted, the sixteen logical partitions are uniformly sized, and the physical partitions are not uniformly sized. In another example embodiment, the sixteen logical partitions may be remapped to nine physical partitions. For one example, the nine physical partitions may comprise seven partitions having sizes of one eighth of the total storage capacity of storage area 300. Also for this example, the nine physical partitions may further comprise two partitions having sizes of one sixteenth of the total storage capacity of storage area 300. Of course, this is merely another example remapping and/or partitioning scheme, and the scope of claimed subject matter is not limited in this respect.

Although the examples described herein describe sixteen logical partitions, the scope of claimed subject matter is not limited in this respect, and other embodiments are possible remapping other numbers of logical partitions to other numbers of physical partitions. For example, other embodiments may utilize eight logical partitions. In one possible implementation, the number of logical partitions may be eight and a non-volatile memory device may have four physical partitions. For this example, a first of the four physical partitions may have a storage capacity of one half of the total storage capacity of the memory device, a second of the four physical partitions may have a storage capacity of one fourth the total storage capacity, and a third and a fourth of the four physical partitions may have storage capacities of one eighth of the total storage capacity. It may be noted that in order to save die area, fewer physical partitions than logical partitions may be implemented. Further, in order to provide the desired flexibility to allow the system designer to efficiently divide the banks of memory, the physical partitions may be implemented with varying sizes, for one or more embodiments.

Figure 5:
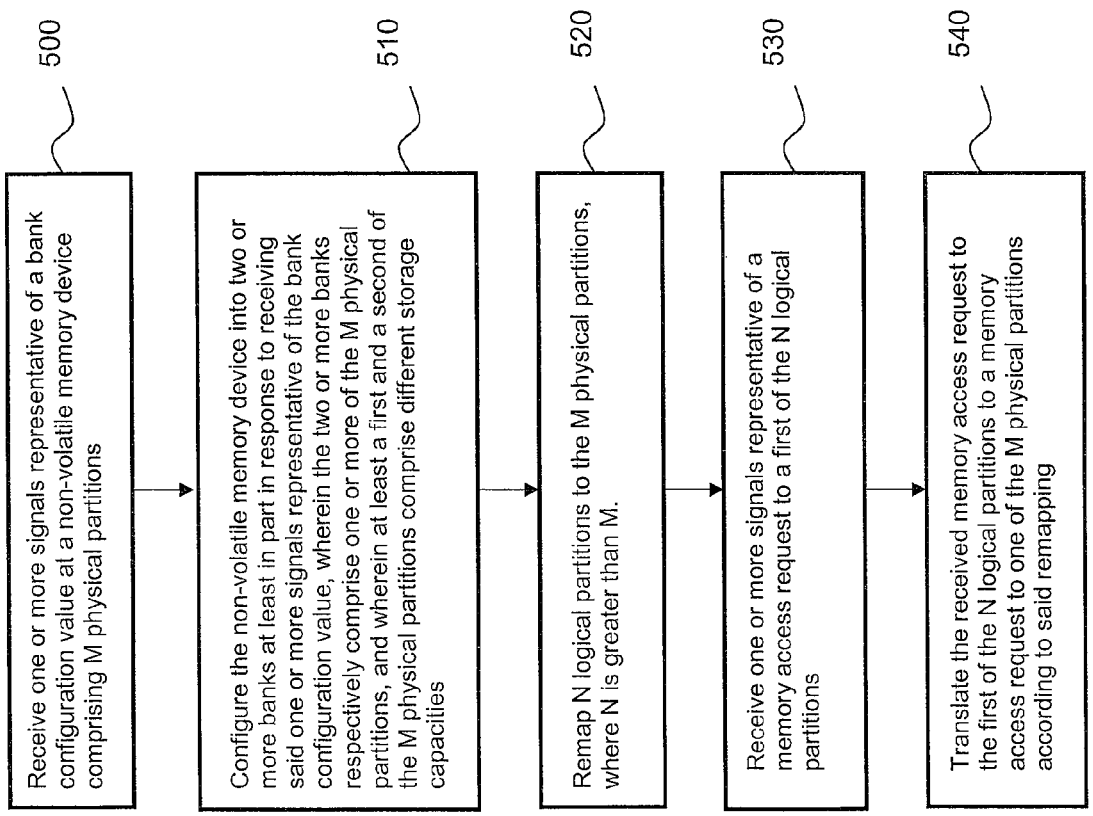
FIG. 5 is a flow diagram illustrating an example embodiment of a process for partitioning a non-volatile memory.

FIG. 5 is a flow diagram illustrating an example embodiment of a method for partitioning a non-volatile memory. At block 500, one or more signals representative of a bank configuration value may be received at a non-volatile memory device. For an embodiment, the non-volatile memory device may comprise M physical partitions. At block 510, the non-volatile memory device may be configured into two or more banks at least in part in response to receiving said one or more signals representative of the bank configuration value, wherein the two or more banks respectively comprise one or more of the M physical partitions, and wherein at least a first and a second of the M physical partitions comprise different storage capacities. At block 520, N logical partitions may be remapped to the M physical partitions. For an embodiment, N is greater than M. At block 530, one or more signals representative of a memory access request to a first of the N logical partitions may be received, and the received memory access request to the first of the N logical partitions may be translated to a memory access request to one of the M physical partitions according to said remapping. Embodiments in accordance with claimed subject matter may include all, less than, or more than blocks 500-540. Also, the order of blocks 500-540 is merely an example order, and the scope of claimed subject matter is not limited in this respect.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding description, various aspects of claimed subject matter have been described. For purposes of explanation, systems or configurations were set forth to provide an understanding of claimed subject matter. However, claimed subject matter may be practiced without those specific details. In other instances, well-known features were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A method, comprising:
    receiving one or more signals representative of a bank configuration value at a non-volatile memory device comprising M physical partitions;
    configuring the non-volatile memory device into two or more banks at least in part in response to receiving said one or more signals representative of the bank configuration value, wherein one or more of the two or more banks respectively comprise two or more of the M physical partitions individually comprising different storage capacities; and
    remapping N logical partitions to the M physical partitions, wherein N is greater than M, and wherein M and N individually comprise positive integers.

2. The method of claim 1, further comprising:
    receiving one or more signals representative of a memory access request to a first of the N logical partitions; and
    translating the received memory access request to the first of the N logical partitions to a memory access request to one of the M physical partitions according to said remapping.

3. The method of claim 2, further comprising:
    storing said one or more signals representative of the bank configuration value in a bank configuration register in the non-volatile memory, wherein said configuring the non-volatile memory comprises configuring the non-volatile memory at least in part in response to said storing the one or more signals representative of the bank configuration value in the bank configuration register, wherein said two or more banks are configured in accordance with the bank configuration value.

4. The method of claim 3, wherein said two or more banks comprise a first bank and a second bank, and wherein said bank configuration value defines a boundary between the first bank and the second bank.

5. The method of claim 2, wherein said M physical partitions comprise $1+\log_2(N)$ physical partitions, wherein N comprises a positive integer that is a power of two.

6. The method of claim 5, wherein N is sixteen and wherein M is five, wherein a first of the M physical partitions comprises a storage capacity of T/2, wherein T comprises a total storage capacity of the non-volatile memory, wherein a second of the M physical partitions comprises a storage capacity of T/4, wherein a third of the M physical partitions comprises a storage capacity of T/8, wherein a fourth of the M physical partitions comprises a storage capacity of T/16, and wherein a fifth of the M physical partitions comprises a storage capacity of T/16.

7. The method of claim 5, wherein N is eight and wherein M is four, wherein a first of the M physical partitions comprises a storage capacity of T/2, wherein T comprises a total storage capacity of the non-volatile memory, wherein a second of the M physical partitions comprises a storage capacity of T/4, wherein a third of the M physical partitions comprises a storage capacity of T/8, and wherein a fourth of the M physical partitions comprises a storage capacity of T/8.

8. A non-volatile memory device, comprising:
    M physical partitions configured into two or more banks, wherein one or more of the two or more banks respectively comprise two or more of the M physical partitions individually comprising different storage capacities; and
    partition remapping logic to remap N logical partitions to the M physical partitions, wherein N is greater than M, and wherein M and N individually comprise positive integers.

9. The memory device of claim 8, further comprising:
a plurality of input buffers to receive address and control signals, said input buffers to receive a memory access request to a first of the N logical partitions, said partition remapping logic to translate the received memory access request to the first of the N logical partitions to a memory access request to one of the M physical partitions according to said remapping.

10. The memory device of claim 9, further comprising:
a bank configuration register to store a bank configuration value received at the input buffers, wherein said two or more banks are configured in accordance with the bank configuration value at least in part in response to said storing the bank configuration value in the bank configuration register.

11. The memory device of claim 10, wherein said two or more banks comprise a first bank and a second bank, and wherein said bank configuration value defines a boundary between the first bank and the second bank.

12. The memory device of claim 9, wherein the M physical partitions comprise $1+\log_2(N)$ physical partitions, wherein N comprises a positive integer that is a power of two.

13. The memory device of claim 12, wherein N is sixteen and wherein M is five, wherein a first of the M physical partitions comprises a storage capacity of T/2, wherein T comprises a total storage capacity of the non-volatile memory, wherein a second of the M physical partitions comprises a storage capacity of T/4, wherein a third of the M physical partitions comprises a storage capacity of T/8, wherein a fourth of the M physical partitions comprises a storage capacity of T/16, and wherein a fifth of the M physical partitions comprises a storage capacity of T/16.

14. The memory device of claim 12, wherein N is eight and wherein M is four, wherein a first of the M physical partitions comprises a storage capacity of T/2, wherein T comprises a total storage capacity of the non-volatile memory, wherein a second of the M physical partitions comprises a storage capacity of T/4, wherein a third of the M physical partitions comprises a storage capacity of T/8, and wherein a fourth of the M physical partitions comprises a storage capacity of T/8.

15. A system, comprising:
a processor; and
a non-volatile memory device coupled to the processor, the memory device comprising
M physical partitions configured into two or more banks, wherein one or more of the two or more banks respectively comprise two or more of the M physical partitions individually comprising different storage capacities; and
partition remapping logic to remap N logical partitions to M physical partitions, wherein N is greater than M, and wherein M and N individually comprise positive integers.

16. The system of claim 15, wherein the memory device further comprises a plurality of input buffers to receive address and control signals from the processor, said input buffers to receive a memory access request from the processor to a first of the N logical partitions, said partition remapping logic to translate the received memory access request to the first of the N logical partitions to a memory access request to one of the M physical partitions according to said remapping.

17. The system of claim 16, wherein the memory device further comprises a bank configuration register to store a bank configuration value received at the input buffers from the processor, wherein said two or more banks are configured in accordance with the bank configuration value at least in part in response to said storing the bank configuration value in the bank configuration register, wherein said bank configuration value defines a boundary between a first bank and a second bank of said two or more banks.

18. The system of claim 16, wherein said M physical partitions comprise $1+\log 2(N)$ physical partitions, wherein N comprises a positive integer that is a power of two.

19. The system of claim 18, wherein N is sixteen and wherein M is five, and wherein a first of the M physical partitions comprises a storage capacity of T/2, wherein T comprises a total storage capacity of the non-volatile memory, wherein a second of the M physical partitions comprises a storage capacity of T/4, wherein a third of the M physical partitions comprises a storage capacity of T/8, wherein a fourth of the M physical partitions comprises a storage capacity of T/16, and wherein a fifth of the M physical partitions comprises a storage capacity of T/16.

20. The system of claim 18, wherein N is eight and wherein M is four, and wherein a first of the M physical partitions comprises a storage capacity of T/2, wherein T comprises a total storage capacity of the non-volatile memory, wherein a second of the M physical partitions comprises a storage capacity of T/4, wherein a third of the M physical partitions comprises a storage capacity of T/8, and wherein a fourth of the M physical partitions comprises a storage capacity of T/8.

* * * * *

UNITED STATES PATENT AND TRADEMARK OFFICE
CERTIFICATE OF CORRECTION

PATENT NO. : 8,230,196 B1  
APPLICATION NO. : 12/473629  
DATED : July 24, 2012  
INVENTOR(S) : Emanuele Confalonieri et al.

It is certified that error appears in the above-identified patent and that said Letters Patent is hereby corrected as shown below:

In column 12, line 26, in Claim 18; delete "1+log 2(N)" and insert -- $1+\log_2(N)$ --, therefor.

Signed and Sealed this  
Twenty-fifth Day of September, 2012

David J. Kappos  
*Director of the United States Patent and Trademark Office*